United States Patent
Niitani et al.

(10) Patent No.: US 11,735,715 B2
(45) Date of Patent: Aug. 22, 2023

(54) ANODE MATERIAL FOR SODIUM ION BATTERY, AND SODIUM ION BATTERY

(71) Applicant: TOYOTA JIDOSHA KABUSHIKI KAISHA, Toyota (JP)

(72) Inventors: Keita Niitani, Shizuoka-ken (JP); Shin Ushiroda, Susono (JP); Hiroko Kuwata, Susono (JP); Masato Hozumi, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 17/075,938

(22) Filed: Oct. 21, 2020

(65) Prior Publication Data
US 2021/0143410 A1  May 13, 2021

(30) Foreign Application Priority Data

Nov. 7, 2019  (JP) ................................ 2019-202537

(51) Int. Cl.

| | |
|---|---|
| *H01M 4/133* | (2010.01) |
| *H01M 10/054* | (2010.01) |
| *H01M 4/62* | (2006.01) |
| *H01M 4/02* | (2006.01) |
| *H01M 50/431* | (2021.01) |
| *H01M 10/0562* | (2010.01) |

(52) U.S. Cl.
CPC ............ *H01M 4/133* (2013.01); *H01M 4/62* (2013.01); *H01M 10/054* (2013.01); *H01M 10/0562* (2013.01); *H01M 50/431* (2021.01); *H01M 2004/021* (2013.01); *H01M 2004/027* (2013.01); *H01M 2300/0068* (2013.01); *H01M 2300/0088* (2013.01)

(58) Field of Classification Search
None
See application file for complete search history.

(56) References Cited

U.S. PATENT DOCUMENTS

| | | | |
|---|---|---|---|
| 2016/0104889 A1 | 4/2016 | Kano et al. | |
| 2020/0091499 A1* | 3/2020 | Yoshima | ........... H01M 10/0566 |

FOREIGN PATENT DOCUMENTS

| | | |
|---|---|---|
| EP | 3 343 679 * | 7/2018 |
| WO | 2014/188722 A1 | 11/2014 |

OTHER PUBLICATIONS

E. Irisarri et al., "Review-Hard Carbon Negative Electrode Materials for Sodium-Ion Batteries", Journal of The Electrochemical Society, 2015, 162(14), pp. A2476-A2482.

* cited by examiner

*Primary Examiner* — Laura Weiner
(74) *Attorney, Agent, or Firm* — Sughrue Mion, PLLC

(57) ABSTRACT

To provide an anode material that can improve the efficiency of the initial charging and discharging, the anode material includes an amorphous glassy carbon material that is an anode active material, and a NaMH compound that is a solid electrolyte.

3 Claims, 2 Drawing Sheets

ANODE MATERIAL FOR SODIUM ION BATTERY, AND SODIUM ION BATTERY

FIELD

The present application relates to an anode material for sodium ion batteries, and a sodium ion battery.

BACKGROUND

Lithium ion secondary batteries are used as power sources for mobile devices and as automotive batteries, as their characteristics of high capacity and the lightweight are fully used. A great rise in prices of raw materials for lithium is giving cause for concern. Thus, attention is being paid to sodium ion batteries using sodium, whose reserves as a resource are rich, as a material substituted for lithium.

E. Irisarri et al., "Review-Hard Carbon Negative Electrode Materials for Sodium-Ion Batteries", J. Electrochem. Soc., 2015, 162, A2476-A2482. discloses a sodium secondary battery using a hard carbon as an anode active material, and a nonaqueous electrolyte solution obtained by dissolving a sodium salt in a carbonate solvent, as an electrolyte. WO 2014/188722 A1 discloses a sodium-ion secondary battery using a porous carbon material as an anode active material.

SUMMARY

Technical Problem

As described in E. Irisarri et al., it is well known to use a hard carbon as an anode active material of a sodium ion battery. The inventors of the present application have intensively researched a sodium ion battery using an amorphous glassy carbon material like a hard carbon. As a result, they found that when a nonaqueous electrolyte solution is used in the sodium ion battery, the nonaqueous electrolyte solution is easily reduced and decomposed at the contact point of the hard carbon and the nonaqueous electrolyte solution in the initial charging. A reduced and decomposed nonaqueous electrolyte solution deteriorates the efficiency of the initial charging and discharging, which is problematic.

With the foregoing circumstances in view, a major object of the present application is to provide an anode material that can improve the efficiency of the initial charging and discharging.

Solution to Problem

As a result of their further research to solve the foregoing problem, the inventors of the present application found that an anode material obtained by mixing the amorphous glassy carbon material with a given NaMH compound is used in a sodium ion battery, which improves the efficiency of the initial charging and discharging. Based on this findings, the present application discloses means for solving the foregoing problem.

That is, the present application discloses, as one means for solving the foregoing problem, an anode material comprising: an amorphous glassy carbon material that is an anode active material; and a NaMH compound that is a solid electrolyte.

In the anode material, a BET surface area of the glassy carbon material is preferably 32 $m^2/g$ to 1050 $m^2/g$. The NaMH compound is preferably a NaCBH compound. The NaCBH compound is preferably a solid solution containing $NaCB_9H_{10}$ and $NaCB_{11}H_{12}$. The molar ratio of said $NaCB_9H_{10}$:said $NaCB_{11}H_{12}$ is preferably equal to 50:50 to 90:10. Further, the weight ratio of the glassy carbon material:the NaMH compound is preferably equal to 40:60 to 70:30.

The present application also discloses a sodium ion battery comprising: a cathode active material layer; an anode active material layer; and an electrolyte layer arranged between the cathode active material layer and the anode active material layer, wherein the anode active material layer contains the anode material.

In the sodium ion battery, the electrolyte layer is preferably a solid electrolyte layer containing the NaMH compound.

Advantageous Effects

The present disclosure can provide an anode material that can improve the efficiency of the initial charging and discharging when the anode material is used in a sodium ion battery. The present disclosure can also provide a sodium ion battery including this anode material.

DESCRIPTION OF EMBODIMENTS

[Anode Material]

Figure 1:
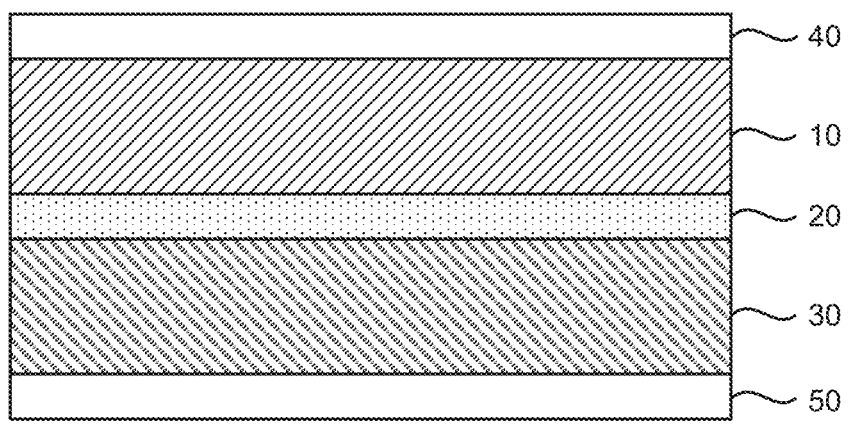
FIG. 1 is a schematic cross-sectional view of a sodium ion battery 100.

An anode material (anode mixture) of the present disclosure contains an amorphous glassy carbon material that is an anode active material, and a NaMH compound that is a solid electrolyte.

NaMH compounds have sodium ion conductivity. Reduction and decomposition in the initial charging when a NaMH compound is used are suppressed compared to those when a nonaqueous electrolyte is used. Nonaqueous electrolyte solutions are easily reduced and decomposed even at low potential on one hand, decomposition of a NaMH compound in such a circumstance is suppressed on the other hand. Thus, when the anode material is used in a sodium ion battery, the efficiency of the initial charging and discharging of the battery can be improved since sodium ion conductivity is kept at the contact point of the glassy carbon material and the NaMH compound, and moreover reduction and decomposition in the initial charging are suppressed.

Each material will be hereinafter described.

(Glassy Carbon Material)

The glassy carbon material is not particularly limited as long as being amorphous. Examples thereof include hard carbon (also referred to as non-graphitizable carbon) that is a kind of amorphous carbon. The glassy carbon material shows preferred properties as an anode active material in a sodium ion battery, and can store a Na ion therein.

The BET surface area of the glassy carbon material is not particularly limited, but is preferably large because: in a battery using a nonaqueous electrolyte solution as an electrolyte, when the BET surface area of a glassy carbon material enlarges, reduction and decomposition usually increase since the contact area of the glassy carbon material and the nonaqueous electrolyte solution enlarges, which makes it impossible for the carbon to exhibit its actual capacity on one hand; when a NaMH compound that is a solid electrolyte is used, the carbon can exhibit its actual capacity since a larger BET surface area can lead to a larger contact area of the glassy carbon material and the NaMH compound, and suppress more reduction and decomposition on the other hand. Specifically, the BET surface area of the glassy carbon material is preferably 32 $m^2/g$ to 1050 $m^2/g$. The BET surface area of the glassy carbon material within this range makes it possible to keep the efficiency of the initial charging and discharging, and moreover to improve the initial discharge capacity when the anode material is used in a sodium ion battery. The BET surface area of the glassy carbon material over 1050 $m^2/g$ does not always bring about such effect because too large a BET surface area leads to a high probability of reduction and decomposition.

It has been conventionally known that amorphous glassy carbon materials such as hard carbons have a high capacity, and therefore, when such a glassy carbon material is combined with a nonaqueous solution, the nonaqueous solution may reduce and decompose.

In contrast, as the results of their intensive research, the inventors of the present application found that since NaMH compounds are resistant to reduction and decomposition, and since NaMH compounds are difficult to be impregnated with glassy carbon materials because being solids, reduction and decomposition can be suppressed and an actual high capacity of a glassy carbon material can be brought out even if the BET surface area of the glassy carbon material is more or less large. The inventors of the present application also found that the combination of a glassy carbon material and a NaMH compound suppresses reduction and decomposition, and further seldom leads to chemical decomposition (chemical reaction) on their contact face.

However, as described above, it was found that too large a BET surface area of a glassy carbon material leads to too large a contact area of the glassy carbon material and a NaMH compound, and thus leads to a high probability of reduction and decomposition, which is not preferable.

Here, in the present description, a BET surface area means a specific surface area obtained by analysis of adsorption isotherm obtained by the N2 adsorption method, based on the BET theory.

The mean particle diameter of the glassy carbon material is not particularly limited, but for example, can be within the range of 50 nm to 100 µm. Here, in the present description, a mean particle diameter means a particle diameter at 50% of the cumulative particles in order from fine in the particle distribution on the basis of volume, which is measured by the laser diffraction and scattering method.

Generally, the glassy carbon material can be produced by carbonizing a raw material including a carbon element. The carbonization temperature is, for example, approximately 1000 to 2000° C. The carbonization is preferably carried out in an inert atmosphere.

The raw material of the glassy carbon material is not particularly limited as long as the glassy carbon material can be produced therefrom. Examples thereof include organic compounds such as alcohols including ethanol, phenols, and aldehydes including formaldehyde. Other than them, a resin such as phenol resins, polyacrylonitrile, and polyimide can be the raw material. One of them may be used alone or a plurality of them may be used in combination for the raw material.

(NaMH Compound)

The NaMH compound contains a sodium salt of a hydrogen complex ion, and has sodium ion conductivity. Reduction and decomposition in the initial charging when the NaMH compound is used are suppressed compared to those when a nonaqueous electrolyte is used.

The NaMH compound is a sodium salt of a hydrogen complex ion, and is specifically a compound represented by Na(MHn), which is composed of a sodium ion and [complex ion (MHn)$^-$], or a solid solution (molecular crystal) including this compound. M includes at least one selected from the group consisting of non-metallic elements such as C, B and N, and metallic elements such as Al and Ni. The NaMH compound may be a compound composed of a single molecule of Na(MHn), or may be a solid solution (molecular crystal) composed of plural molecules of Na(MHn). Other additives may be contained therein. That is, any NaMH compound containing at least Na(MHn) may be used.

The NaMH compound is preferably a NaCBH compound. The NaCBH compound is a sodium salt of a carborane ([CBn-$_1$Hn]$^-$) that is a cluster anion, or a solid solution (molecular crystal) including this sodium salt. Such a NaCBH compound may be a compound composed of a sodium salt of a single carborane, or may be a solid solution composed of sodium salts of plural carboranes. Other additives may be contained therein. That is, any NaCBH compound composed of at least a sodium salt of a carborane may be used.

Further preferred embodiment of the NaCBH compound is a solid solution containing $NaCB_9H_{10}$ and $NaCB_{11}H_{12}$, or a solid solution consisting of $NaCB_9H_{10}$ and $NaCB_{11}H_{12}$. Employing $NaCB_9H_{10}$ and $NaCB_{11}H_{12}$ for sodium salts of carboranes which compose the NaCBH compound improves the sodium ion conductivity of the NaCBH compound.

The molar ratio of $NaCB_9H_{10}:NaCB_{11}H_{12}$ is preferably equal to 50:50 to 90:10, more preferably equal to 60:40 to 80:20, and further preferably equal to 65:35 to 75:25. This further improves sodium ion conductivity.

As a method of producing the NaMH compound, for example, a raw material composition undergoes a solid-phase reaction, which makes it possible to obtain the NaMH compound. The solid-phase reaction can be undergone by ball milling. The solid-phase reaction is preferably undergone in an inert atmosphere. The skilled person can set any other conditions suitably.

(Anode Material)

The weight ratio of glassy carbon material:NaMH compound is preferably equal to 40:60 to 70:30, more preferably equal to 50:50 to 70:30, and further preferably equal to 50:50 to 60:40. This makes it possible to control the contact point of the glassy carbon material and the NaMH compound within a suitable range.

The anode material is a mixture including the glassy carbon material and the NaMH compound. The method of mixing these materials is not particularly limited. They may be just mixed, or may be mixed as mechanical energy is applied thereto using ball milling or the like.

The anode material of the present disclosure suppresses reduction and decomposition in the initial charging as keeping the sodium ion conductivity at the contact point of the glassy carbon material and the NaMH compound when used in a sodium ion battery, and thus can improve the efficiency of the initial charging and discharging of the battery. Therefore, the anode material of the present disclosure can be preferably used in a sodium ion battery. Hereinafter a sodium ion battery using the anode material of the present disclosure will be described.

[Sodium Ion Battery]

FIG. 1 shows a schematic cross-sectional view of a sodium ion battery 100 that is an example of a sodium ion battery using the anode material of the present disclosure. As shown in FIG. 1, the sodium ion battery 100 includes a cathode active material layer 10, an anode active material layer 30, and an electrolyte layer 20 that is arranged between the cathode active material layer 10 and the anode active material layer 30. As shown in FIG. 1, in the sodium ion battery 100, a cathode current collector 40 may be arranged over a face of the cathode active material layer 10 which is not on the solid electrolyte layer 20 side, and an anode current collector 50 may be arranged over a face of the anode active material layer 30 which is not on the solid electrolyte layer 20 side.

The anode active material layer 30 contains the above described anode material. Thus, the sodium ion battery 100 can improve the efficiency of the initial charging and discharging of the battery.

<Cathode Active Material Layer 10>

The cathode active material layer 10 contains at least a cathode active material. The cathode active material layer 10 can further contain a conductive material, a binder, and a solid electrolyte optionally.

(Cathode Active Material)

Any known cathode active material for sodium ion batteries can be employed for the cathode active material. Examples thereof include composite oxides containing Na. "Composite oxide containing Na" means an oxide containing a metal element other than Na (such as transition metal elements) and/or a non-metallic element (such as P and S), in addition to Na. Examples thereof include layered compounds, spinel compounds, and polyanionic compounds. Specific examples of layered compounds and spinel compounds include $NaxMO_2$ ($0<x \leq 1$ where M is at least one of Fe, Ni, Co, Mn, V, and Cr), and specific examples of polyanionic compounds include $Na_3V_2(PO_4)_3$, $Na_2Fe_2(SO_4)_3$, $NaFePO_4$, $NaFeP_2O_7$, $Na_2MP_2O_7$ (M is at least one of Fe, Ni, Co and Mn), and $Na_4M_3(PO_4)_2P_2O_7$ (M is at least one of Fe, Ni, Co and Mn).

The cathode active material is preferably in the form of a particle. The average particle diameter of the cathode active material is, for example, within the range of 1 nm to 100 μm, which is preferably 10 nm to 30 μm. The content of the cathode active material in the cathode active material 10 is not particularly limited, but for example, preferably 60 mass % to 99 mass %, and more preferably 70 mass % to 95 mass %, when the total mass of the cathode active material 10 is defined as 100 mass %.

(Conductive Material)

The conductive material is not particularly limited, and any known one as a conductive material for sodium ion batteries can be employed. Examples thereof include carbon materials such as acetylene black, Ketjenblack, VGCF (vapor-grown carbon fiber) and graphite. The content of the conductive material in the cathode active material layer 10 is not particularly limited, but is preferably within the range of 5 mass % to 40 mass %, and more preferably within the range of 10 mass % to 40 mass %.

(Binder)

The binder is not particularly limited as long as being chemically and electrically stable. Examples thereof include fluorine-based binding materials such as polyvinylidene fluoride (PVdF) and polytetrafluoroethylene (PTFE), rubber-based binding materials such as styrene-butadiene rubber (SBR), olefinic binding materials such as polypropylene (PP) and polyethylene (PE), and cellulose-based binding materials such as carboxymethyl cellulose (CMC). The content of the binder in the cathode active material layer 10 is not particularly limited, but is preferably within the range of 1 mass % to 40 mass %.

(Solid Electrolyte)

The solid electrolyte is not particularly limited as long as having desired ionic conductivity. Examples thereof include the above described NaMH compound, and known oxide and sulfide solid electrolytes. Among them, the NaMH compound is preferably used. Examples of oxide solid electrolyte materials include $NaZr_2Si_2PO_{12}$, and β-alumina solid electrolytes (such as $Na_2O-11Al_2O_3$). Examples of sulfide solid electrolyte materials include $Na_2S-P_2S_5$. The solid electrolyte may be amorphous, or may be crystalline. The solid electrolyte preferably has a particulate shape. The mean particle diameter of the solid electrolyte is, for example, within the range of 1 nm to 100 μm, which is preferably 10 nm to 30 μm. The content of the solid electrolyte in the cathode active material layer 10 is not particularly limited, but preferably within the range of 1 mass % to 40 mass %.

The thickness of the cathode active material layer 10 is suitably adjusted according to the structure of the battery, and is usually, but not particularly limited to, 0.1 μm to 1 mm.

The method of making the cathode active material layer 10 is not particularly limited. The cathode active material layer 10 can be easily made in a dry or wet condition. That is, the foregoing components are added to a suitable solvent to be a slurry, and the slurry is applied to a surface of a base material (may be the cathode current collector or solid electrolyte layer, which will be described later) and thereafter dried up, which makes it possible to easily make the cathode active material layer 10 having a given thickness in a wet condition. Or, the cathode active material layer 10 may be obtained by, for example, mixing the foregoing components in a dry condition, and press-molding the mixture.

<Electrolyte Layer 20>

The electrolyte layer 20 is a layer formed between the cathode active material layer 10 and the anode active material layer 30. The electrolyte layer 20 conducts ions between the cathode active material and the anode active material via an electrolyte contained therein. The aspect of the electrolyte layer 20 is not particularly limited. The electrolyte layer 20 can be a liquid electrolyte layer, a gel electrolyte layer, a solid electrolyte layer, or the like.

The liquid electrolyte layer is usually a layer formed by using a nonaqueous electrolyte solution. The nonaqueous electrolyte solution usually contains a sodium salt and a nonaqueous solvent. Examples of the sodium salt include inorganic sodium salts such as $NaPF_6$, $NaBF_4$, $NaClO_4$ and $NaAsF_6$; and organic sodium salts such as $NaCF_3SO_3$, $NaN(CF_3SO_2)_2$, $NaN(C_2F_5SO_2)_2$, $NaN(FSO_2)_2$, and $NaC(CF_3SO_2)_3$.

The nonaqueous solvent is not particularly limited as long as dissolving the sodium salt. Examples of solvents of high dielectric constant include cyclic esters (cyclic carbonates) such as ethylene carbonate (EC), propylene carbonate (PC), and butylene carbonate (BC), γ-butyrolactone, sulfolane, N-methylpyrrolidone (NMP), and 1,3-dimethyl-2-imidazolidinone (DMI). Examples of low viscosity solvents include linear esters (linear carbonates) such as dimethyl carbonate (DMC), diethyl carbonate (DEC), and ethyl methyl carbonate (EMC), acetates such as methyl acetate, and ethyl acetate, and ethers such as 2-methyltetrahydrofuran. A mixed solvent obtained by mixing a solvent of high dielectric constant and a low viscosity solvent may be used.

The concentration of the sodium salt in the nonaqueous electrolyte solution is, for example, within the range of 0.3 mol/L to 5 mol/L, and preferably within the range of 0.8 mol/L to 1.5 mol/L because too low a concentration of the sodium salt may cause a low capacity at a high rate, and too high a concentration of the sodium salt causes a high viscosity, which may result in a low capacity at low temperature. For example, a liquid of low volatility such as an ionic liquid may be used as the nonaqueous electrolyte solution.

For example, the gel electrolyte layer can be obtained by adding a polymer to the nonaqueous electrolyte solution to gelatinate the nonaqueous electrolyte solution. Specifically, the nonaqueous electrolyte solution can be gelatinated by adding thereto a polymer such as polyethylene oxide (PEO), polyacrylonitrile (PAN) and polymethyl methacrylate (PMMA).

The solid electrolyte layer is a layer formed by using a solid electrolyte. The solid electrolyte is not particularly limited as long as having Na ion conductivity. Examples thereof include the above described NaMH compound, and known oxide and sulfide solid electrolytes. Among them, the NaMH compound is preferably used. Examples of oxide solid electrolytes include $Na_3Zr_2Si_2PO_{12}$, and $\beta$-alumina solid electrolytes (such as $Na_2O-11Al_2O_3$). Examples of sulfide solid electrolytes include $Na_2S—P_2S_5$. The solid electrolyte may be amorphous, or may be crystalline. The solid electrolyte preferably has a particulate shape. The mean particle diameter of the solid electrolyte is, for example, within the range of 1 nm to 100 μm, which is preferably 10 nm to 30 μm.

The content of the solid electrolyte in the solid electrolyte layer is preferably at least 80.0 mass %, more preferably at least 90.0 mass %, further preferably at least 95.0 mass %, and further preferably at least 99.0 mass %, when the total mass of the solid electrolyte layer is defined as 100 mass %. The upper limit is not particularly limited. The solid electrolyte layer may be formed of the solid electrolyte only.

The solid electrolyte layer can contain a binder to bind particles of the solid electrolyte to each other in view of development of plasticity etc. In view of prevention of low ionic conductivity of the solid electrolyte layer, the content of the binder is preferably at most 20 mass %, more preferably at most 10 mass %, further preferably at most 5 mass %, and further preferably at most 1 mass %, when the total mass of the solid electrolyte layer is defined as 100 mass %.

The thickness of the solid electrolyte layer is suitably adjusted according to the structure of the battery, and is usually, but is not particularly limited to, 0.1 μm to 1 mm.

Examples of the way of forming such a solid electrolyte layer may include pressure molding on a powder of the material of the solid electrolyte layer, which includes the solid electrolyte, and other components as necessary. As another way thereof, one may apply a slurry for solid electrolyte layers which contains a binder onto a support, dry up the slurry for solid electrolyte layers, and remove the support, to form the solid electrolyte layer.

<Anode Active Material Layer 30>

The anode active material layer 30 contains the above described anode material. The anode active material layer 30 can further contain a conductive material and a binder optionally.

The anode material has been described above, and thus description thereof is omitted here. The content of the anode material is preferably at least 60 mass %, more preferably at least 70 mass %, and further preferably at least 80 mass %, when the total mass of the anode active material layer 30 is defined as 100 mass %. The upper limit of the content of the anode material is not particularly limited, and the anode active material layer 30 may consist of the anode material. In view of the content of the optional components, the content of the anode material in the anode active material layer 30 may be at most 99 mass %, and may be at most 95 mass %.

Any conductive material and binder same as those which can be employed for the cathode active material layer 10 can be employed for a conductive material and a binder that can be contained in the anode active material layer 30. They are optional components, and the contents thereof are not particularly limited either. The composition thereof may be the same as in the cathode active material layer 10.

The thickness of the anode active material layer 30 is suitably adjusted according to the structure of the battery, and is usually, but is not particularly limited to, 0.1 μm to 1 mm.

The way of making the anode active material layer 30 is not particularly limited. The anode active material layer 30 can be easily made in a dry or wet condition as well as the cathode active material layer 10.

<Cathode Current Collector 40>

The cathode active material layer 10 usually includes the cathode current collector 40 arranged on the face of the cathode active material layer 10, which is not on the solid electrolyte layer 20 side. Examples of the material of the cathode current collector 40 include SUS, aluminum, nickel, iron, titanium, and carbon. For example, the cathode current collector 40 may be in the form of foil, in the form of mesh, or in a porous form. Stacking the cathode current collector 40 onto the cathode active material layer 10 makes it possible to easily make a cathode. The cathode current collector 40 may be omitted according to the material contained in the cathode active material layer 10. In this case, the cathode active material layer 10 itself is the cathode.

<Anode Current Collector 50>

The anode active material layer 30 usually includes the anode current collector 50 arranged on the face of the anode active material layer 30, which is not on the electrolyte layer 20 side. Examples of the material of the anode current collector 50 include SUS, aluminum, nickel, copper, and carbon. For example, the anode current collector 50 may be in the form of foil, in the form of mesh, or in a porous form. Stacking the anode current collector 50 onto the anode active material layer 30 makes it possible to easily make an anode. The anode current collector 50 may be omitted according to the material contained in the anode active material layer 30. In this case, the anode active material layer 30 itself is the anode.

<Other Structures>

A general battery case can be used as a battery case of the sodium ion battery 100 without any particular limitations. Examples thereof include a battery case made from SUS. The sodium ion battery 100 may be a primary battery, or may be a secondary battery. The sodium ion battery 100 is preferably a secondary battery in view of a more effective improvement in durability because secondary batteries can be repeatedly charged and discharged, and are useful for, for example, automotive batteries. Primary batteries include batteries used as a primary battery (used for the purpose of discharge once after charged). For example, the sodium ion battery 100 may be in the form of a coin, a laminate, a cylinder, or a rectangle. The method of producing the sodium ion battery is not particularly limited, but is the same as any method of producing general sodium ion batteries.

EXAMPLES

Hereinafter anode materials and sodium ion batteries using these anode materials will be described using Examples.

Example 1

(Synthesizing NaCBH compound)

$NaCB_9H_{10}$ (manufactured by Katchem Ltd.) and $NaCB_{11}H_{12}$ (manufactured by Katchem Ltd.), which were subjected to vacuum drying at 160° C. overnight, were weighed so as to have the molar ratio of 7:3, and put into a 45 mL pot made from $ZrO_2$. Further, 20 balls made from $ZrO_2$ each having a diameter of 5 mm were put into the pot, and mixed at 500 rpm for 20 hours. Thereby a NaCBH compound was obtained.

(Synthesizing Glassy Carbon Material)

At 0° C., 8 mL of hydrochloric acid at 0.01 M (manufactured by KISHIDA CHEMICAL Co., Ltd.), 1.2 mL of absolute ethanol (manufactured by KISHIDA CHEMICAL Co., Ltd.), 4.4 g of resorcinol (manufactured by Sigma-Aldrich, Inc.), and 6 mL of formaldehyde (manufactured by Sigma-Aldrich, Inc.) were mixed, allowed to stand at 40° C. for 24 hours, and dried up at 80° C. for 24 hours. Ethanol at 60° C. was mixed to the resultant mixture to be allowed to stand for 4 hours and then washed, which was repeated 3 times, and then dried up at 60° C. overnight. Next, the resultant mixture was subjected to pretreatment that was heating in an Ar gas flow at 1000° C. for 2 hours, and thereafter calcined in an Ar atmosphere at 1500° C. for 2 hours. Thereby an amorphous glassy carbon material was obtained. The BET surface area of the obtained glassy carbon material was measured with BELSORP-max (manufactured by BEL JAPAN, Inc.). The measurement results of the BET surface area is shown in Table 1.

(Making Sodium Ion Battery)

Into a tube made from Macor, 100 mg of the synthesized NaCBH compound was put, and pressed at 0.1 ton, to obtain a separator layer (electrolyte layer). Next, the glassy carbon material and the NaCBH compound, which were fully crushed with an agate mortar, were mixed so as to have the weight ratio of 58:42, and 10 mg of the resultant mixture was pressed at 2 ton, to obtain an anode active material layer. Na metal was used as a counter electrode. The Na metal, the electrolyte layer, and the anode active material layer were arranged in this order to be constrained by a SUS pin arranged on either side thereof as a current collector so that their contact was entirely kept, to be sealed into a glass desiccator. This operation was carried out in a glovebox having an Ar atmosphere therein. Thereby, a sodium ion battery according to Example 1 was obtained.

(Charge-Discharge Test)

For the obtained sodium ion battery, the anode was charged at 20 mA/g in current density to 0 V, and after a 10-minute rest, was discharged at 20 mA/g in current density to 2 V, and a 10-minute rest was given. The results of the initial charge capacity, the initial discharge capacity, and the efficiency of the initial charging and discharging at that time were shown in Table 1.

Example 2

A sodium ion battery was made and the charge-discharge test was done thereon in the same manner as in Example 1 except using CARBOTRON P (manufactured by KUREHA CORPORATION) as the glassy carbon material.

Example 3

A sodium ion battery was made and the charge-discharge test was done thereon in the same manner as in Example 1 except that KURARAY COAL YP (manufactured by KURARAY CO., LTD.) was calcined in an Ar atmosphere at 2000° C. for 2 hours to obtain the glassy carbon material.

Example 4

A sodium ion battery was made and the charge-discharge test was done thereon in the same manner as in Example 1 except that KURARAY COAL YP (manufactured by KURARAY CO., LTD.) was calcined in an Ar atmosphere at 1500° C. for 2 hours to obtain the glassy carbon material.

Comparative Example 1

After the glassy carbon material in Example 1 was fully crushed with an agate mortar, the glassy carbon material and PVdF were weighed so as to have the weight ratio of 9:1, and dispersed in NMP (N-methylpyrrolidone) to make a slurry. Next, the made slurry was coated over copper foil, to be dried and rolled, and thereafter punched to obtain an anode of 16 mm in diameter. In a glovebox having an Ar atmosphere therein, the made anode, an electrolyte solution (1 M $NaPF_6$ EC:DEC (volume ratio 5:5)), and Na metal, which was a counter electrode, were used, to make a sodium ion battery according to Comparative Example 1. On the made sodium ion battery, the charge-discharge test was done in the same manner as in Example 1.

Comparative Example 2

A sodium ion battery was made in the same manner as in Comparative Example 1 using the glassy carbon material in Example 2, and the charge-discharge test was done thereon in the same manner as in Comparative Example 1.

Comparative Example 3

A sodium ion battery was made in the same manner as in Comparative Example 1 using the glassy carbon material in Example 3, and the charge-discharge test was done thereon in the same manner as in Comparative Example 1.

Comparative Example 4

A sodium ion battery was made in the same manner as in Comparative Example 1 using the glassy carbon material in Example 4, and the charge-discharge test was done thereon in the same manner as in Comparative Example 1.

TABLE 1

| | BET surface area ($m^2$/g) | Initial charge capacity (mAh/g) | Initial discharge capacity (mAh/g) | Efficiency of initial charging and discharging (%) |
|---|---|---|---|---|
| Example 1 | 3 | 342 | 334 | 98 |
| Example 2 | 8 | 251 | 235 | 94 |
| Example 3 | 32 | 427 | 417 | 98 |
| Example 4 | 1050 | 473 | 456 | 96 |

TABLE 1-continued

|  | BET surface area (m$^2$/g) | Initial charge capacity (mAh/g) | Initial discharge capacity (mAh/g) | Efficiency of initial charging and discharging (%) |
|---|---|---|---|---|
| Comparative Example 1 | 3 | 356 | 318 | 89 |
| Comparative Example 2 | 8 | 305 | 260 | 85 |
| Comparative Example 3 | 32 | 211 | 130 | 62 |
| Comparative Example 4 | 1050 | 257 | 21 | 8 |

[Results]

Figure 2:
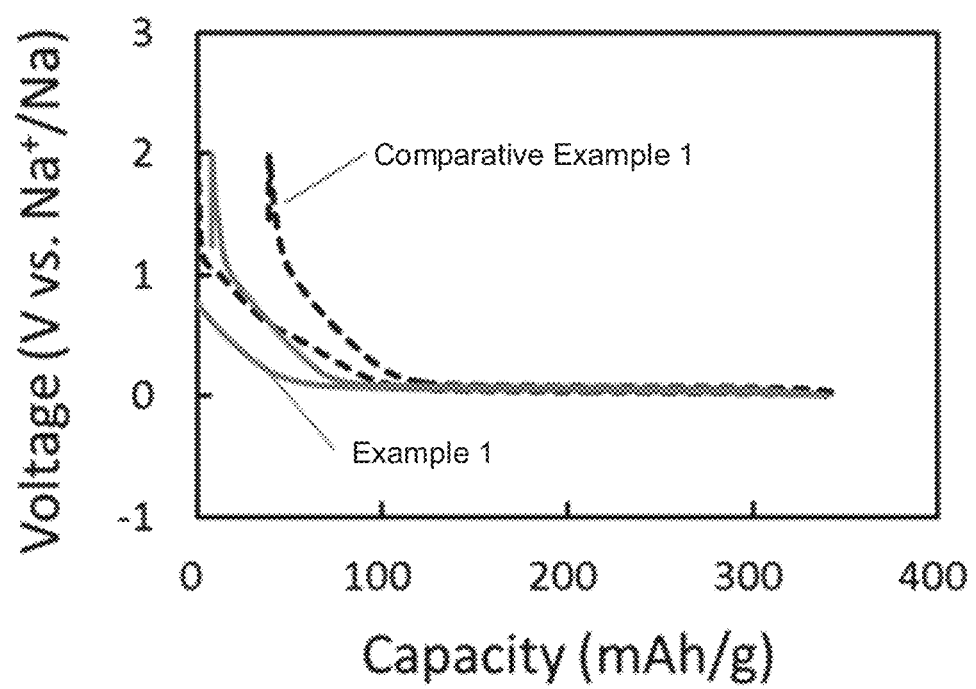
FIG. 2 is a graph showing the results of charge-discharge tests in Example 1 and Comparative Example 1.

As is seen from Table 1, Examples 1 to 4 resulted in higher efficiency of the initial charging and discharging than Comparative Examples 1 to 4, respectively. For example, when Example 1 and corresponding Comparative Example 1 are compared, as is seen in Table 1 and FIG. 2, which shows the initial charge-discharge curves in Example 1 and Comparative Example 1, it is apparent that Example 1 had a low irreversible capacity, and efficiency of the initial charging and discharging therein was improved, compared to Comparative Example 1. The comparison between Example 2 and Comparative Example 2 shows the same. The reason why the efficiency of the initial charging and discharging was improved as described above is believed to be because the use of the NaCBH compound caused the sodium ion conductivity to be maintained, and then led to suppressed reduction and decomposition in the contact point of the glassy carbon material and the NaCBH compound more than the case where a nonaqueous electrolyte solution is used.

Among Examples 1 to 4, Examples 3 and 4 resulted in an improved initial discharge capacity as high efficiency of the initial charging and discharging was kept. This is believed to be because the contact area of the glassy carbon material and the NaCBH compound enlarged.

In each of Comparative Examples 3 and 4, the BET surface area was larger than in Comparative Examples 1 and 2, which led to a larger contact area of the electrolyte solution and the glassy carbon material, and a tendency to cause reduction and decomposition. Thus, Comparative Examples 3 and 4 resulted in low efficiency of the initial charging and discharging, and also low initial charge capacity and low initial discharge capacity. In Examples 3 and 4 corresponding to Comparative Examples 3 and 4, it is believed that such reduction and decomposition were suppressed, and thus their actual capacities can be brought out.

REFERENCE SIGNS LIST 10 cathode active material layer
20 electrolyte layer
30 anode active material layer
40 cathode current collector
50 anode current collector
100 sodium ion battery

What is claimed is:

1. An anode material for a sodium ion battery, the anode material comprising:
    an amorphous glassy carbon material; and
    a sodium metal hydride (NaMH) solid electrolyte compound,
    wherein the NaMH compound is a solid solution containing $NaCB_9H_{10}$ and $NaCB_{11}H_{12}$,
    wherein a BET surface area of the glassy carbon material is 32 m$^2$/g to 1050 m$^2$/g, and
    wherein a weight ratio of the glassy carbon material:the NaMH compound is equal to 40:60 to 70:30.

2. The anode material according to claim 1, wherein a molar ratio of said $NaCB_9H_{10}$: said $NaCB_{11}H_{12}$ is equal to 50:50 to 90:10.

3. A sodium ion battery comprising:
    a cathode layer;
    an anode layer; and
    an electrolyte layer arranged between the cathode layer and the anode layer,
    wherein the anode layer contains the anode material according to claim 1.

* * * * *